Feb. 26, 1935.   R. S. BLAIR   1,992,647
CONSTRUCTION FOR MOTOR VEHICLES
Filed May 11, 1927   2 Sheets-Sheet 1
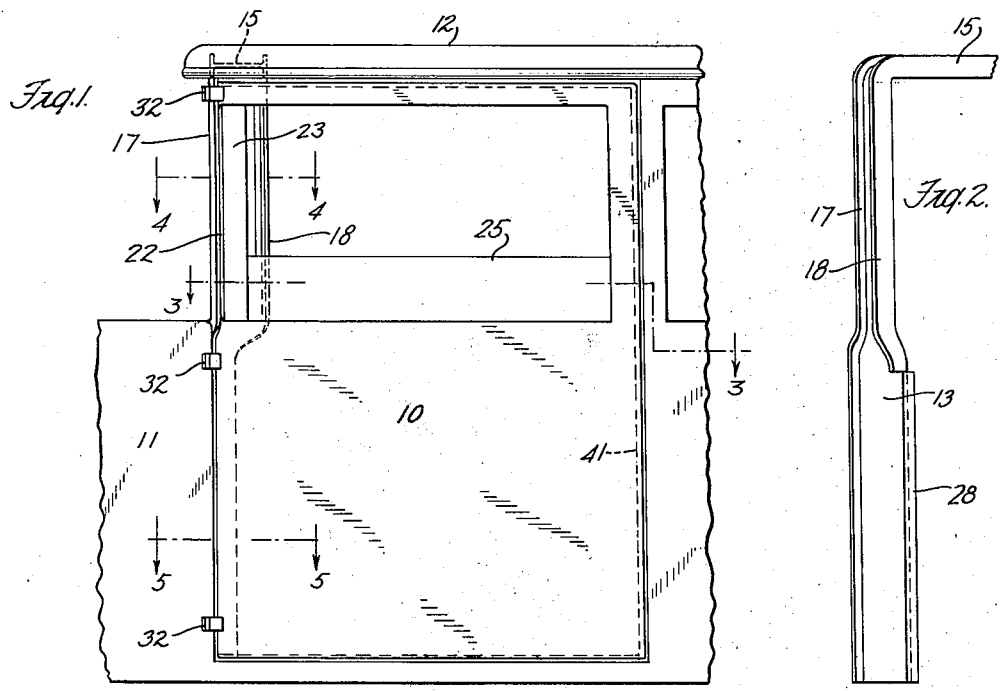
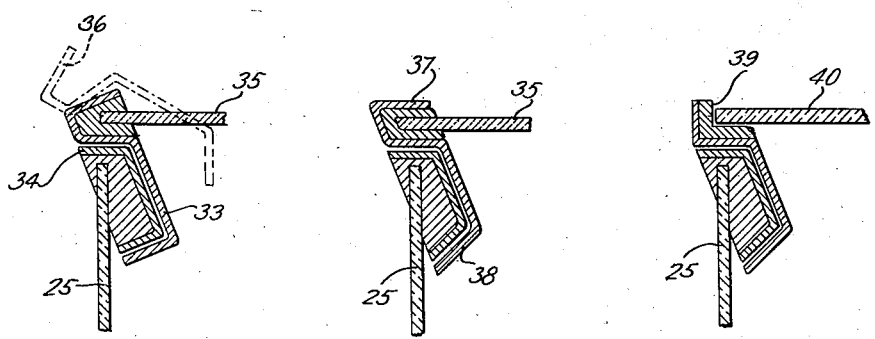
INVENTOR
Robert S. Blair Feb. 26, 1935.  R. S. BLAIR  1,992,647
CONSTRUCTION FOR MOTOR VEHICLES
Filed May 11, 1927  2 Sheets-Sheet 2
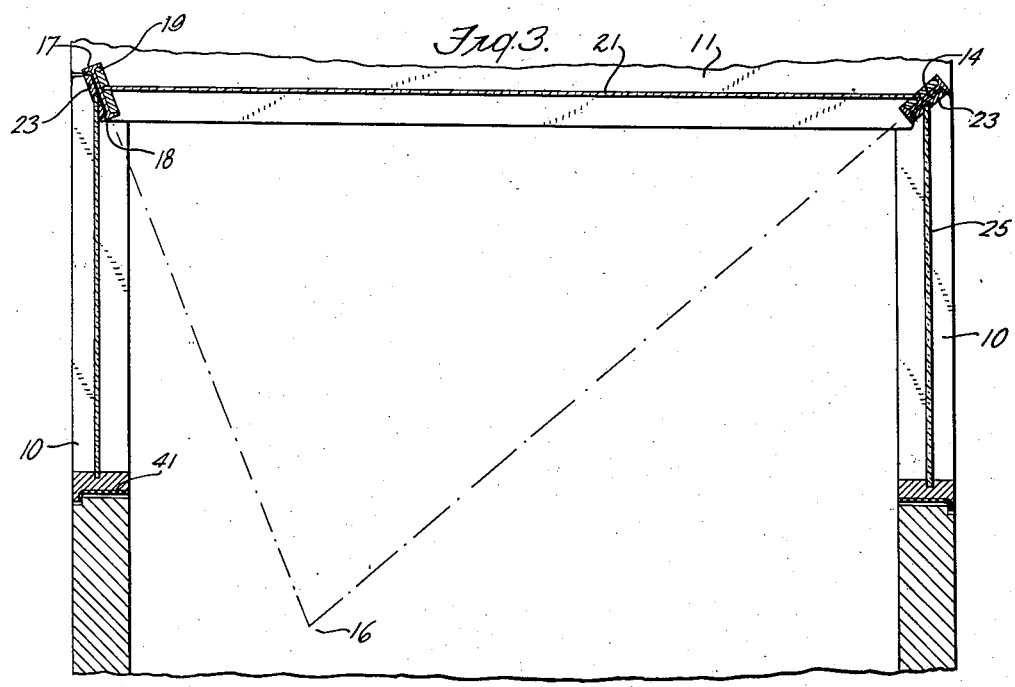
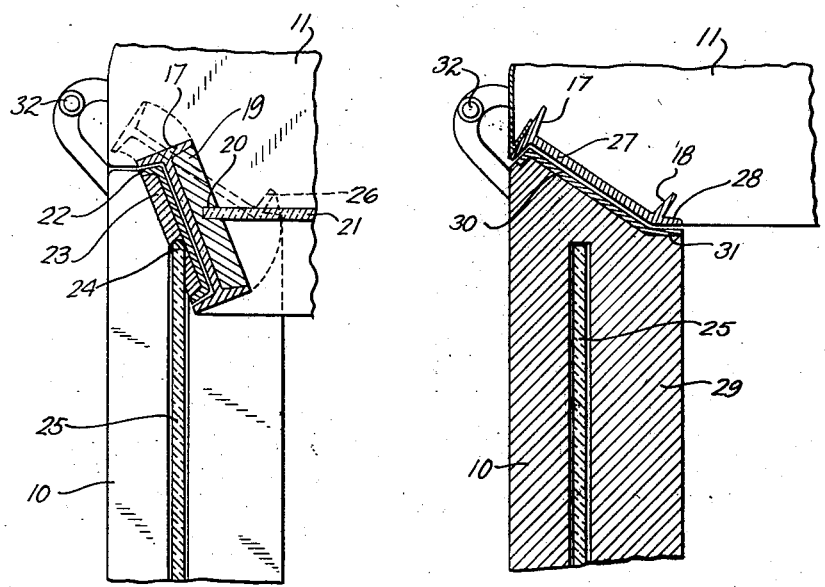
INVENTOR
Robert S. Blair Patented Feb. 26, 1935

1,992,647

UNITED STATES PATENT OFFICE 1,992,647

CONSTRUCTION FOR MOTOR VEHICLES

Robert S. Blair, Stamford, Conn.

Application May 11, 1927, Serial No. 190,434

13 Claims. (Cl. 296—28)

This invention relates to construction for motor vehicles, and more particularly for the forward portions thereof.

One of the objects thereof is to provide simple and practical means whereby the freedom of vision of the driver is enhanced. Another object is to provide means of the above nature of strong and yet light construction. Another object is to provide means of the above nature which shall be reliable and efficient in action. Another object is to provide a construction for the forward portion of motor vehicles whereby the parts are compactly disposed and strength and rigidity attained without cumbersome parts. Other objects will be in part obvious and in part pointed out hereinafter.

The invention accordingly consists in the features of construction, combination of elements and arrangement of parts which will be exemplified in the construction hereinafter described and the scope of the application of which will be indicated in the following claims.

In the accompanying drawings, in which is shown one or more of various possible embodiments of the several features of this invention, Figure 1 is a side elevation of the forward portion of a motor vehicle;

Fig. 2 is a rear view of an upright supporting element shown in Fig. 1;

Fig. 3 is a sectional plan taken substantially along the line 3—3 of Fig. 1;

Fig. 4 is a similar view on a larger scale taken along the line 4—4 of Fig. 1;

Fig. 5 is a similar view on a similar scale taken along the line 5—5 of Fig. 1;

Fig. 6 is a sectional plan similar to Fig. 4 with supporting members of different cross section;

Fig. 7 is a view similar to Fig. 6 showing another variation in cross section of these parts; and Fig. 8 is a view also similar to Fig. 6 and showing another variation of the supporting parts appearing in section.

Similar reference characters refer to similar parts throughout the several figures of the drawings.

Referring now to Fig. 1 of the drawings in detail, there is shown the forward portion of a motor vehicle comprising the front door 10, hood 11 and roof 12. The upright supporting members or posts at the forward end of the body are of broadly similar construction, and the left-hand post (facing forwardly of the vehicle) is indicated at 13 in Fig. 2 of the drawings. The right-hand post 14 (Fig. 3) is connected with post 13 across the top as indicated at 15 in Fig. 2 by a mere continuation with preferably integral construction. In other words, these post members, which in their upper portions are of flanged steel construction here shown as of I-cross section, forming a single member extended across the top at 15 and anchored to the body frame at their lower portions in any desired manner. By this construction a high degree of strength and rigidity is attained with metal of light form.

Referring now to Fig. 3 of the drawings, it is assumed that the eyes of the driver are positioned substantially at a point which may be indicated as at 16. The chief obstruction in the field of view of the driver in a closed car is provided obviously by the forward supporting posts. In the present case these posts being of flanged steel with their length of cross section extending in a general longitudinal direction of the vehicle reduce this obstruction to a minimum, in fact much less than is indicated in the drawings. To enhance this effect, the maximum length of each of these posts is preferably directed toward the point of vision of the driver thus giving a greater inclination transversely of the vehicle with the right-hand post 14 than with the left-hand post 13, as shown in Fig. 3. With a vehicle built for driving at the left-hand, the relative inclinations would obviously be reversed.

Aside from the above feature, the construction of these posts and the relation of each to the adjacent door is substantially identical, and accordingly the construction of these parts at the right-hand only will be described in detail.

The upper portion of post 13 is provided between its end flanges 17 and 18 with a filler block 19 which may be formed of wood and held in position in any desired manner. This filler block is provided with means for receiving the adjacent edge of the windshield, in this case such means comprising a groove 20 to receive the edge of a sliding windshield 21. This filler block being flush with the edges of the flanges 17 and 18 forms no additional obstruction to the vision of the driver.

Between these flanges on the rear surface there is fitted a channel member 22 having a filler block 23 provided with a groove in which rests the edge 24 of the ordinary sliding window 25.

At the top of the door body 29, the post 13 is bent sharply forward and thence directly down and also turned more nearly transversely of the vehicle. The position of the post and its cross section in this lower part are indicated in dotted lines at 26 in Figs. 4 and 5 of the drawings, and preferably the rear portion of the flange 18 is bent forwardly as at 28 to provide a wider opening for the body portion 29 of the door. Similarly the channel member 22 where it extends below the lower edge of the window is preferably bent to follow the post 13 taking a forwardly displaced position 30 and having its rear flange bent forwardly as at 31 to fit the form of flange 28. This provides the body portion of the door with additional length so as to give ample room for the mechanism by which the window 25 is raised and lowered. Such mechanism may be of the usual type and is not here shown. Furthermore, the lower portion 30 of the channel being secured with the forward edge of the body of the door greatly increases its strength and provides a rigid support for the upper portion of the channel.

As the door is swung about the several coaxial hinges 32, the upper channel swings out of the recess between the flanges 17 and 18 and the lower portion 30—31 swings away from the adjacent lower portion of the post. With the door closed, however, as is generally the case with the car in motion, these parts are swung into their interlocking relation and mutually contribute to the stiffness of the structure as a whole at that portion.

As illustrative of certain variations in cross section of the post and upper portion of the door member, three forms are shown in Figs. 6, 7 and 8.

In Fig. 6 this upper post section 33 is of a general S form, thus providing a deeper recess to receive the door channel 34 as well as ample accommodation for the windshield 35. The lower portion of this post is forwardly displaced and laterally turned as indicated at 36 to provide a suitable longitudinal extension of the body of the door, and it is to be understood that in these several constructions the major length of the upper post construction is in the line of vision of the driver.

In Fig. 7 there is shown a slightly different arrangement of the flanges of the post member, as indicated at 37 and 38; otherwise the construction is the same.

In Fig. 8 there is a variation in the forward portion to provide a forwardly open recess 39 to permit the use of a forwardly swinging windshield 40, it being understood that this variation may also be used in the constructions hereinbefore described if it is desired to employ a swinging windshield.

The use and action of the apparatus above described will, it is believed, be obvious. The door is operated in the usual manner and, although given ample space for its interior construction, it is nevertheless compactly disposed and, in fact, interlocked when closed with the frame of the vehicle. Furthermore, its channel construction, which may extend entirely across the top and downwardly at its rear edge as indicated in dotted lines at 41 in Fig. 1 of the drawings, contributes much to the stiffness and strength of this part and permits the use of light metal.

The windshield is operated in the usual way, being accommodated by a slot if it is of the sliding type, or a recess if of the swinging type. The post construction at the part where it crosses the line of vision of the driver forms a negligible obstruction to the view, and by its connection across the top of the vehicle gives added stiffness to the frame.

It will accordingly be seen that the several objects of this invention are accomplished and that the embodiments described are well suited to meet the conditions of hard, practical use.

As various changes might be made in the above construction, and as the invention might be embodied in other physical forms, it is to be understood that all matter hereinbefore described or shown in the accompanying drawings is to be interpreted as illustrative and not in a limiting sense.

I claim as my invention:

1. In construction for motor vehicles, in combination, a roof, a body, an upright integral flanged metal support for a forward corner of said roof, the lower portion of said support extending downwardly into the lower portion of the frame of the body to form a portion thereof and shaped to be forwardly offset with respect to its upper portion, and a door having a body portion fitting against the lower portion of said support and having an upper glass-supporting portion coacting with the upper portion of said support, said upright support being substantially the same size throughout and extending substantially to the bottom of the vehicle body.

2. In construction for motor vehicles, in combination, an upright member adapted to support a forward corner of the roof, and a windshield member extending substantially parallel thereto and forming the entire support for the adjacent edge of the glass thereof and lying substantially between the upright planes which bound said first member in the line of vision of the driver, said first member being substantially elongated in said line of vision and laterally inclined to lie substantially along said line of vision and extending downwardly substantially to the bottom of the body of the vehicle.

3. In construction for motor vehicles, in combination, an upright metal member adapted to support a forward corner of the roof and shaped to form a pair of recesses facing in substantially opposite directions, a windshield member movably resting within one of said recesses, and a member at an upper forward portion of a door movably resting within and substantially embraced by the other of said recesses, the cross-section of said first member at its upper portion extending substantially in the line of vision of the driver and the lower portion thereof being twisted so as to forwardly displace its rear edge and permit the lower portion of the door to project forwardly.

4. In construction for motor vehicles, in combination, an upright member adapted to support a forward corner of the roof and of a general S-shaped cross-section and formed of solid metal, a windshield member resting within one of the recesses in said first member, and a member at the forward edge of the upper portion of a door resting within the other of said recesses and movable with respect thereto the rear edge of said first member being outwardly directed and said windshield and door members respectively resting substantially against the opposite surfaces of said upright member.

5. In construction for motor vehicles, in combination, an upright metal member of relatively thin cross-section and non-closed form adapted to support a forward corner of the roof and having at its rear and forward edges respectively a flange which is directed outwardly away from the vehicle and a flange which is so directed as to form a recess, a windshield movably resting within the recess formed by said last flange against one surface of said member, and a door member mounted to swing within said first flange against the opposite surface of said member.

6. In construction for motor vehicles, in combination, an upright metal member adapted to support a forward corner of the roof and having a cross-section extending substantially in a line of vision of the driver and the rear portion of which is of a general channel form, a windshield member mounted substantially upon the forward portion of said upright member, and a member at the upper forward portion of a door mounted to swing in and out of said channel portion of said upright member, said upright member being shaped to provide a lower portion forwardly offset with respect to said roof-supporting portion and adapted to accommodate a forwardly extending lower portion of the door.

7. In construction for motor vehicles, in combination, an upright metal member adapted to support a forward corner of the roof, said member being substantially formed of a solid sheet extending inwardly and thence forwardly and thence outwardly and thence forwardly, an upright member serving as a support for the forward edge of the glass of the door mounted to swing into a position between said inwardly and outwardly directed portions of said first member and substantially resting against the first-named forwardly directed portion thereof and an upright member for supporting the adjacent edge of the windshield resting adjacent the second-named forward portion of said first member, said windshield member and said door member respectively resting against opposite surfaces of said first member.

8. In construction for motor vehicles, in combination, an upright metal member adapted to support a forward corner of the roof, said member being substantially formed of a solid sheet extending inwardly and thence forwardly and thence outwardly and thence forwardly, an upright member serving as a support for the forward edge of the glass of the door mounted to swing into a position between said inwardly and outwardly directed portions of said first member and substantially resting against the first-named forwardly directed portion thereof and an upright member for supporting the adjacent edge of the windshield resting adjacent the second-named forward portion of said first member, said first member being elongated in cross section substantially in the line of vision of the driver and said door and windshield members resting substantially between the upright planes which bound said first member in the line of vision of the driver, said windshield member and said door member respectively resting against opposite surfaces of said first member.

9. In construction for motor vehicles, in combination, a support for a forward corner of the roof formed of solid metal, relatively thin as compared with its outer dimensions, and shaped in cross section with a portion at the rear extending at an angle to the line of vision of the driver and thence a portion turning in a forward and outward general direction and thence a portion turning toward an inward direction whereby the general cross section is elongated in the direction of vision of the driver and bending stresses are resisted.

10. In construction for motor vehicles, in combination, a support for a forward corner of the roof formed of solid metal, relatively thin as compared with its outer dimensions, and shaped in cross section with a portion at the rear extending at an angle to the line of vision of the driver and thence a portion turning in a forward and outward general direction and thence a portion turning toward an inward direction whereby the general cross section is elongated in the direction of vision of the driver and bending stresses are resisted, a door member resting substantially against said second portion, and a windshield member resting within the recess formed by said second and third portions.

11. In construction for motor vehicles, in combination, a support for a forward corner of the roof formed of solid metal, relatively thin as compared with its outer dimensions, and shaped in cross section with a portion at the rear extending at an angle to the line of vision of the driver and thence a portion turning in a forward and outward general direction and thence a portion turning toward an inward direction whereby the general cross section is elongated in the direction of vision of the driver and bending stresses are resisted, a door member resting substantially against said second portion, and a windshield member resting within the recess formed by said second and third portions, said door and windshield members being substantially embraced by the upright planes which bound said support in the line of vision of the driver.

12. In motor vehicle construction, in combination, a substantially integral solid metal member formed of metal which is relatively thin as compared with the outer dimensions thereof, said member extending upwardly from the lower portion of the body of the vehicle on each side substantially to the roof and across from one side to the other, and each of the portions of said member in the line of vision of the driver comprising in cross section a pair of forward and rear flanges connected by a web which lies in the general direction of the line of vision of the driver.

13. In motor vehicle construction, in combination, a support for the forward portion of the roof, formed of a substantially integral solid metal member of flanged cross section which extends from the lower portion of the body of the vehicle, thence upwardly to the roof and across the roof and downwardly to the lower portion of the body on the opposite side, the upright portions of said member having their lower ends forwardly offset with respect to and substantially parallel to the portions which extend through the line of vision of the driver.

ROBERT S. BLAIR.